US012624556B2

(12) United States Patent
Li

(10) Patent No.: US 12,624,556 B2
(45) Date of Patent: *May 12, 2026

(54) DECORATIVE SURFACE COVERING ELEMENT, SURFACE COVERING ELEMENT COVERING, AND METHOD OF PRODUCING SUCH A DECORATIVE SURFACE COVERING ELEMENT

(71) Applicant: Northann Building Solutions LLC, Elk Grove, CA (US)

(72) Inventor: Lin Li, Elk Grove, CA (US)

(73) Assignee: Northann Building Solutions, LLC, Elk Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/791,600

(22) PCT Filed: Jan. 11, 2021

(86) PCT No.: PCT/IB2021/050164
§ 371 (c)(1),
(2) Date: Jul. 8, 2022

(87) PCT Pub. No.: WO2021/140492
PCT Pub. Date: Jul. 15, 2021

(65) Prior Publication Data
US 2023/0083165 A1 Mar. 16, 2023

(30) Foreign Application Priority Data
Jan. 9, 2020 (NL) ...................................... 2024631

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 5/18* (2013.01); *E04F 13/0866* (2013.01); *E04F 13/0871* (2013.01); *E04F 13/0894* (2013.01); *E04F 15/02038* (2013.01); *B32B 2255/26* (2013.01); *B32B 2255/28* (2013.01); *E04F 2201/0146* (2013.01); *E04F 2201/0153* (2013.01); *E04F 2201/023* (2013.01)

(58) Field of Classification Search
CPC .............. E04F 13/0873; E04F 13/0894; E04F 15/02038; E04F 2201/6138
See application file for complete search history.

(56) References Cited

U.S. PATENT DOCUMENTS

2003/0138617 A1   7/2003   Courtoy et al.
2009/0260307 A1   10/2009   Thiers
(Continued)

FOREIGN PATENT DOCUMENTS

EP   2883712 A1   6/2015
JP   H780995 A   3/1995
(Continued)

*Primary Examiner* — Gisele D Ford
(74) *Attorney, Agent, or Firm* — Loeb & Loeb LLP

(57) ABSTRACT

The invention relates to a decorative surface covering element, in particular a floor panel, ceiling panel or wall panel. The invention also relates to a panel covering, such as a floor covering, ceiling covering or wall covering, including a plurality of panels. The invention further relates to a method of producing a decorative surface covering element.

24 Claims, 6 Drawing Sheets

(51) Int. Cl.
  *B32B 5/18*      (2006.01)
  *E04F 13/08*     (2006.01)
  *E04F 15/02*     (2006.01)

(56)                  References Cited

U.S. PATENT DOCUMENTS

| | | | |
|---|---|---|---|
| 2016/0153190 | A1 | 6/2016 | Doehring |
| 2018/0244877 | A1 | 8/2018 | Miyamoto et al. |

FOREIGN PATENT DOCUMENTS

| | | | |
|---|---|---|---|
| WO | 2011129757 | A1 | 10/2011 |
| WO | 2014202143 | A1 | 12/2014 |
| WO | 2017083415 | A1 | 5/2017 |
| WO | 2017105404 | A1 | 6/2017 |

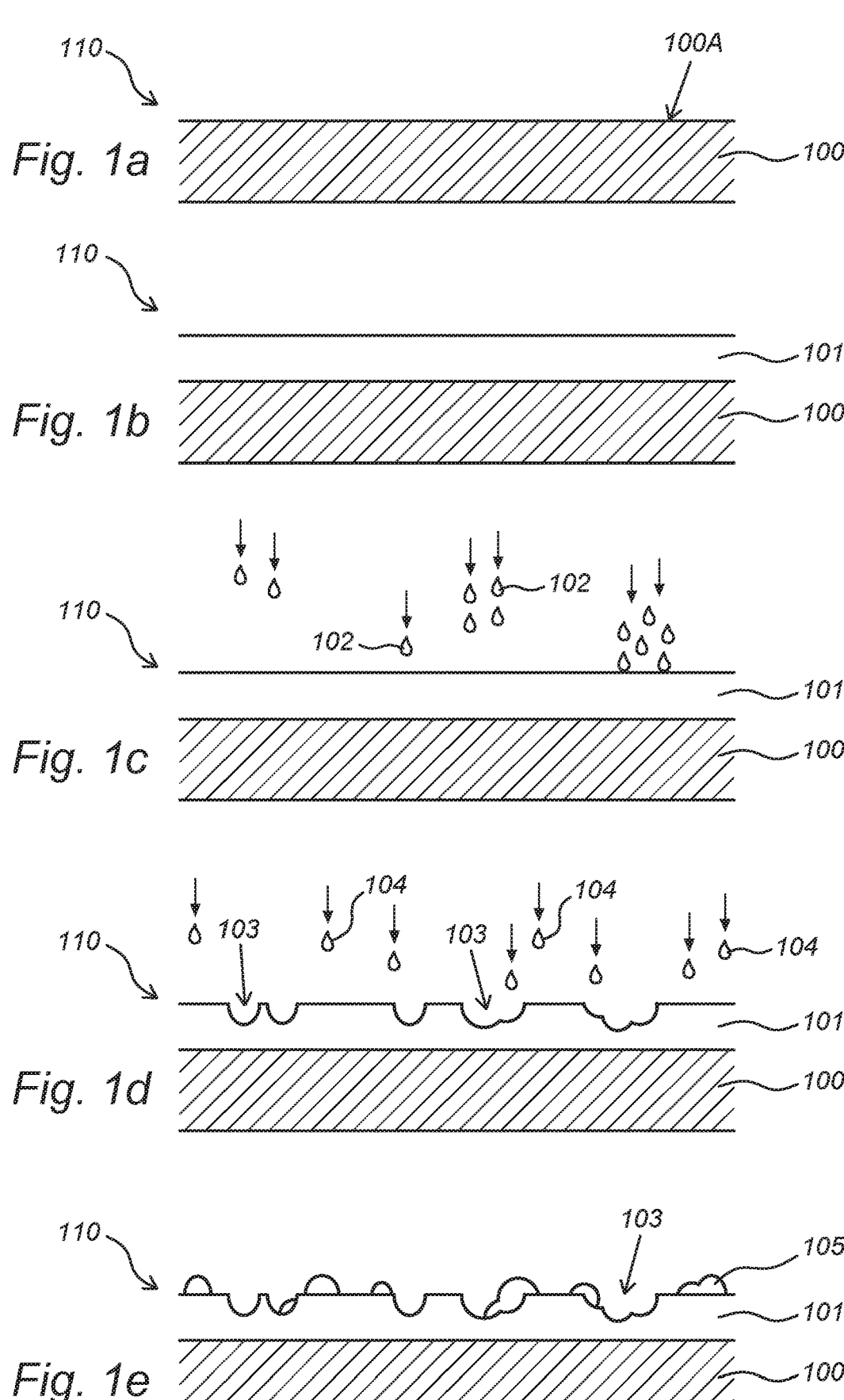

DECORATIVE SURFACE COVERING ELEMENT, SURFACE COVERING ELEMENT COVERING, AND METHOD OF PRODUCING SUCH A DECORATIVE SURFACE COVERING ELEMENT

CROSS-REFERENCE TO RELATED APPLICATIONS

This application is the United States national phase of International Application No. PCT/IB2021/050164 filed Jan. 11, 2021, and claims priority to The Netherlands Patent Application No. 2024631 filed Jan. 9, 2020, the disclosures of which are hereby incorporated by reference in their entirety.

BACKGROUND OF THE INVENTION

Field of the Invention

The invention relates to a decorative surface covering element, in particular a floor surface covering element, ceiling surface covering element or wall surface covering element. The invention also relates to a surface covering element covering, such as a floor covering, ceiling covering or wall covering, comprising a plurality of surface covering elements according to the invention. The invention further relates to a method of producing a decorative surface covering element according to the invention.

Description of Related Art

Laminated panels comprise a decorative layer having a decorative pattern which typically has the appearance of a wood pattern. The decorative layer is covered by a transparent layer to preserve and protect the decorative layer. In order to improve the optical and haptic appearance of the decorative pattern of the decorative layer, impressions can be realized in the transparent layer, this in order to obtain an e.g., imitation of wood pores and other unevennesses which can be present at the surface of real wood. With the known panels, this is performed by simply providing a series of impressions in the floor panels, which impressions substantially extend according to one and the same direction. Notwithstanding the use of such impressions, also known as embossing, the known panels show the disadvantage that the imitation effect still is not optimum. So, for example, they show the disadvantage that if one looks at such floor panels at a relatively small angle, a light refraction at the transparent layer of synthetic matter is created, as a result of which only a glossy surface can be seen, without any visible effect of the actual print being perceived.

SUMMARY OF THE INVENTION

It is an object of the invention to provide an improved surface covering element having an improved embossing effect.

This object can be achieved by providing a surface covering element according to the preamble, comprising: a core provided with an upper side and a lower side, a decorative top structure affixed, directly or indirectly, on said upper side of the core, said decorative top structure comprising: at least one decorative print layer forming at least one décor image, a substantially transparent or translucent three-dimensional embossing structure at least partially covering said print layer, wherein at least a part of an upper surface of the embossing structure is provided with a roughened texture.

The three-dimensional embossing structure is preferably a printed embossing structure comprising one or more printed embossing layers, wherein each embossing layer is substantially composed of (embossing) ink, as will be elucidated below in more detail. Preferably, roughening of the texture of at least of part of the upper surface of the embossing structure is taking place when the embossing ink is partially cured, hence partially (still) soft, which allows the embossing ink to be mechanically deformed and/or mechanically treated relatively easily. Typically, the roughened texture is provided to at least a part of the upper surface of the embossing structure by means of mechanical interaction with said upper surface, preferably by making use of one or more (rotating) brush rollers, such as metal, in particular steel, brush rollers. During this mechanical treatment of at least a part of the upper surface of the embossing structure, material will be removed from and/or displaced of the initial embossing structure, leading to a roughening (sharpening) of the texture of the embossing structure. This roughening effect leads to a relief which comes closer to the look and feel of natural wood nerves, typically also having sharp edges (non-differentiable, discontinuity edges) rather than conventional smooth, rounded edges (which are typically realized by mechanical impressions), which improves the visual appearance and/or haptonomic (tactile) properties of the surface covering element according to the invention. Hence, by means of conventional mechanically impressions a roughened texture cannot be obtained, but merely a relief with smoothly curved boundaries. Apart from this, mechanically impressing a layer covering a decorative layer in order to realize some kind of embossing structure often not only deforms the covering layer, but also the decorative layer, which is highly undesirable as this latter deformation affects, and normally visibly affects, the appearance of the decorative layer, and which normally leads to a distorted, malformed appearance of the decorative layer. By building the embossing structure by means of material deposition (preferably by printing), optionally by means of material etching (preferably also by printing), this serious drawback can be overcome. In this context it has to be taken into account that a printed embossing structure provides infinite possibilities and flexibility to design a desired embossing structure, but the drawback and risk of this printed embossing structure is that this embossing structure is printed by using a liquid ink, which could relatively easily flow (to some extent) directly after printing, which easily leads to a more smooth (rounded) texture than intended. This drawback can be overcome by (mechanically) roughening the printed embossing-preferably soon/directly-after printing to get a more realistic embossing structure (embossing texture) and/or an embossing structure being more in line with the embossing structure as initially intended/desired. Typically, the roughened texture of the upper surface of the embossing structure comprises a plurality of adjacent (connecting), typically substantially flat, surface facets mutually enclosing angle. This lead to one or more sharp edges, which typically improves the look and feel of the surface covering element as experienced by a user. The roughened texture comprises a plurality of scratches and/or grooves. These can e.g. be realized by means of the mechanical brush, in particular a brush roller.

The surface covering element is preferably a board, a cladding, a sheet, a tile, or a panel, such as a floor panel, ceiling panel, wall panel, or furniture covering panel. These panels are typically square or rectangular. It is imaginable that surface covering element is a strip (or sheet) provided as a roll to be laid out by unrolling from said roll. The length of such a strip is typically between 4 and 30 meter. In the context of this document the expressions "surface covering element" and "panel" are interchangeable.

It is preferred in case the embossing structure comprises at least one thixotropic agent. Typically this thixotropic agent makes part of the ink composition for forming the printed embossing structure. Thixotropy is a time-dependent shear thinning property. This allows the embossing ink used to build (at least a part of) the embossing structure to be thick or viscous under static conditions, wherein the viscosity of the ink will decrease upon exertion of mechanical pressure or force allowing the ink to flow and to be deformed more easily. After release of the mechanical pressure or force, the ink returns to a more viscous state. A possible ink composition to be used as embossing ink may comprise: a) at least one organic and/or water-based ink vehicle, (b) at least one ethanolamine compound, and (c) at least one colour-imparting material, such as a pigment. The ethanolamine compound(s) is/are combined with the organic ink vehicle and pigment in sufficient concentration to provide a composition which exhibits desirable thixotropic properties as well as physical, chemical, and visual/colour characteristics suited to the intended application. The organic ink vehicles usable in ink compositions of the present invention include various (a) ink oils and (b) organic resins and/or combinations thereof. Examples of ink oils which are preferably used in the present invention include naphthenic ink oils. The ethanolamine thixotropic agents which may be used in the present invention include monoethanolamine, diethanolamine, and/or triethanolamine. Of these, triethanolamine is presently preferred for use as a thixotropic additive in oil and/or resin-based printing ink compositions. In addition to their ability to impart desirable rheological properties, the inclusion of ethanolamine compounds, such as TEA, within the ink compositions of the present invention has been found to bring about improved rub resistance of the applied printing ink. Such improvement in rub resistance is identified as an additional advantage to be gained by incorporating the ethanolamine compounds of the present invention into ink compositions used in applications wherein rub-off is a typical problem. The colour-imparting additives employable in ink compositions of the present invention include various pigments and/or pigment-containing pastes. Pre-dispersed pigment pastes generally comprise one or more coloured pigments dispersed in a vehicle and/or solvent. The vehicle(s) employed in such pre-dispersed pigment paste may comprise one or more of the organic ink vehicles described herein as basic components of ink compositions of the present invention and/or other vehicles which differ from the above-described organic ink vehicles. The embossing ink compositions which may be used to realize a surface covering element according to the present invention may be prepared at room temperature without the addition of extraneous heat. Such printing ink compositions are known to exhibit desirable thixotropy as well as increased rub resistance. Other thixotropic agents that may be used in the embossing ink to be used are, for example fumed silica and/or clay-type thixotropic agents.

Preferably, the entire upper surface of the embossing structure is provided with a roughened texture. Preferably, each roughened part of the upper surface of the embossing structure is roughened a plurality of times, more preferably by applying a plurality of successive mechanical roughening actions. Each roughening action can roughen the surface of the embossing structure in the same direction, but it is also conceivable that at least two roughening actions treat the upper surface of the embossing structure in mutually different directions.

Preferably, the embossing structure is a multi-layer embossing structure which comprises: at least one, at least partially cured base layer provided with a plurality of indentations, and at least one at least partially cured elevated pattern layer formed by a plurality of elevations printed on top of said base layer. The roughened texture is provided both to at least a part of the base layer and to at least a part of the pattern layer.

Preferably, the surface covering comprises at least one finishing layer at least partially covering the roughened embossing structure. At least one finishing layer is preferably formed by a lacquer layer, in particular an UV lacquer layer (i.e. a lacquer layer which is at least partially cured by ultraviolet (UV) irradiation). By covering the upper surface of the embossing structure a better protection is provided for the surface covering element. The lacquer layer and/or other finishing layer could for example preserve the roughened texture which is provided on the upper surface of the embossing structure. Typically, at least one finishing layers as such is preferably not provided with a roughened texture, and hence is preferably free of a roughened texture. Typically said finishing layers are applied after roughening of the embossing structure. Said finishing layer(s) typically cover(s) the roughened embossing structure as a kind of blanket to protect and preserve the roughened embossing structure. Preferably, the roughened embossing structure is cleaned prior to applying the finishing layer(s). The lacquer layer can comprise any suitable known abrasion-resistant material, such as an abrasion-resistant macromolecular material coated onto the layer beneath it, or a known ceramic bead coating. If the lacquer layer, is furnished in layer form, it can be bonded to the layer beneath it. The lacquer layer can also comprise an organic polymer layer and/or inorganic material layer, such as an ultraviolet coating or a combination of another organic polymer layer and an ultraviolet coating. For example, an ultraviolet paint capable of improving the surface scratch resistance, glossiness, antimicrobial resistance (in case this paint would be provided with at least one antimicrobial agent) and other properties of the product. Other organic polymers including polyvinyl chloride resins or other polymers such as vinyl resins, and a suitable amount of plasticizing agent and other processing additives can be included, as needed The surface covering element according to invention comprises a multi-layer embossing structure which comprises at least one negative embossing layer, wherein indentations (recesses) are applied in a base layer, and at least one positive embossing layer, wherein elevations (protrusions) are provided on top of said negative embossing layer. This results in a more pronounced (rough and hilly) embossing structure, wherein relatively deep embossings may be created, which leads to a more realistic appearance of the surface covering element as such. Due to the relatively deep embossings which may be created by applying the multi-level layered embossing structure, a more realistic light effect as well as a better depth effect can be obtained, wherein the colours of the décor image are typically better perceptible. Typically, an upper side of the base layer defines an embossing base level, and wherein the indentations and at least a part and/or at least a number of the elevations are situated at opposite sides of said embossing base level. It is also imaginable that the indentations and at least a part and/or at least a number of the elevations are situated at the same side of said base level.

Typically, a part of the base layer is provided with said plurality of indentations, and wherein another part of the base layer is free of indentations. Hence, in this embodiment, the base layer is merely partially embossed. The elevations, of at least a part thereof and/or a number thereof, are preferably printed on the part of the base layer which is free of indentations, which leads to an increased depth effect of the embossing structure as such.

It is imaginable that the plurality of indentations of the base layer forms a discontinuous and/or a continuous indentation pattern. It is also imaginable that the plurality of indentations of the base layers forms a regular indentation pattern. Typically, the indentation pattern to be realized is strongly, or even completely, dependent on at least one décor image of the decorative layer.

Preferably, the base layer is a, preferably digitally, printed base layer and/or is a base layer which is applied by spraying, pouring, or rolling an initially liquid substance directly or indirectly on top of the decorative layer. In case of a printed base layer, this means that the base layer, initially in liquid state, is printed either directly or indirectly on top of the decorative layer. One or more indentations may be provided in the base layer when the base layer is still in liquid state and/or one or more indentations may be provided in the base layer during and/or after curing (solidifying) the base layer. Providing one or more indentations in the liquid base layer is preferably done by means of chemically embossing. To this end, preferably (small) droplets of an embossing liquid are position-selectively printed (sprayed), preferably by means of digital printing techniques, onto the liquid base layer to cause a chemical reaction between the material of the printed droplets and the still liquid base layer, wherein the subsequent reaction product changes the structure at this location of the base layer optically and/or haptically. This means that the indentations could be (digitally) printed on or into the base layer. Since the base layer can also be a (digitally) printed layer, the entire embossing structure could be a (digitally) printed structure. Providing one or more indentations in the base layer during or after curing may be done by either chemical embossing (as described above) and/or by mechanical embossing e.g. by using a laser or particle beam, such as a water beam.

Preferably, the indentations provided in the base layer have a depth situated in between 2 micron and 100 micron, preferably situated in between 3 micron and 50 micron. Preferably, the elevations of the elevated pattern layer have a height situated in between 2 micron and 500 micron, preferably situated in between 3 micron and 300 micron. The total embossing depth is determined by the sum of the greatest indentation depth and the greatest elevation height. In case a plurality of base layers and/or a plurality of elevated pattern layers is applied, an increase of the total embossing depth can be achieved.

In a preferred embodiment, at least a part of the indentations of the base layer is aligned in register with at least a part of at least one decor image formed by the decorative print layer. Preferably, at least a part of the elevations of the elevated pattern layer is aligned in register with at least a part of at least one decor image formed by the decorative print layer. More preferably, both at least a part of the indentations of the base layer is aligned in register with at least a part of at least one decor image formed by the decorative print layer and at least a part of the elevations of the elevated pattern layer is aligned in register with at least a part of at least one decor image formed by the decorative print layer. This leads to a dual embossing in register, also referred to a dual synchronised embossing. By applying such an alignment in register a very realistic and/or artistic design and appearance and tactile properties of the surface covering element can be realized. The décor image may be formed by a wood (nerve) pattern, such as an oak (nerve) pattern. The embossed structure, in particular due to the roughened texture thereof, can match this wood (nerve) pattern, resulting in a very realistic look and feel appearance of the surface covering element according to the invention. However, instead of wood (nerve) patterns, it is well thinkable that the décor image represents another kind of pattern, such as, for example, a customized picture and/or a mosaic pattern or tile pattern. In case of a mosaic pattern or tile pattern, artificial tiles may be depicted which are aesthetically separated by one or more grouts. Here, the embossing structure applied may comprise a base layer having thicker layer parts covering the artificial tiles and thinner layer parts covering to one or more grouts. Here, it is also imaginable that elevations of the elevated pattern are predominantly or merely covering the artificial tiles and less or not at all the artificial tiles. In this manner, a realistic surface relief can be realized which is practically equal to the surface relief obtained when using real tiles and grouts.

It is imaginable that at least one additional decorative print layer is situated in at least one base layer and at least one elevated pattern layer. In this manner a multi-layer decorative pattern can be realized. This further increases the freedom of design of creating an decorative top structure including the embossing structure and the plurality of decorative layers, and this, for example, also allows to create a three-dimensional effect to the overall décor image(s). It is also imaginable that a coloured coating is provided in the indentations and onto the base layer. This coloured coating may be considered as additional decorative print layer.

Preferably, the grammage of the base layer is at least 40 g/m$^2$, preferably at least 50 g/m$^2$. Typically, the base layer is made of a radiation-curing material. Preferably, the base layer, at least in the initial liquid state, is made of at least one resin selected from the group consisting of: epoxy acrylates, polyester acrylates, polyether acrylates, amino acrylates, silicone acrylates, urethane acrylates, polyisoprene acrylates, polybutadiene acrylates and acrylate monomers. The term acrylates, also referred to as acrylic resin, includes both acrylate resins and methacrylate resins. The previously described resins are associated in that they polymerize and harden by virtue of the electromagnetic energy irradiated by e.g. a laser, typically a UV laser, an infrared source, and/or a mercury (Hg) light source. In a preferred embodiment, (meth)acrylate resin has a high solid content, for example equal to 20-30% by weight with respect to the weight of the resin, which typically leads to a desired volume increase of the base layer. Optionally, the base layer may comprise one or more photo-initiators to facilitate curing of the base layer. The (transparent and/or translucent) base layer may comprise fillers, such as (i) aluminium oxide, to increase the abrasion resistance thereof, (ii) talc to modify the rheology thereof, (iii) silica to reduce the brilliance thereof, calcium carbonate and/or (iv) other additives, such as rheology modifiers, and/or colorants. Optionally, the base layer may comprise silicones which are capable of increasing the depth of the embossing. Typically, silicones are added in an amount of 0.01-20% by weight of the base layer, preferably in an amount of 0.01% to 10%, more preferably in an amount of 0.01% to 2% by weight of the base layer. Suitable silicones include, for example, silicones, silicone polyethers, silicone acrylates, and silicone polyether acrylates.

Preferably, the base layer, at least in the initial liquid state, comprises propylidynetrimethanol, ethoxylated, esters with acrylic acid, and preferably also N-ethylamine, more preferably N-ethylethanamine. These products typically react with each other leading to an amine modified acrylic oligomer which can be polymerised by free radicals. And this latter property is used for radiation-curing of the base layer.

The base layer, at least in the initial liquid state, preferably comprises an epoxy acrylate oligomer, more preferably bisphenol A epoxy diacrylate. Bisphenol A epoxy diacrylate is a colourless liquid. This epoxy acrylate oligomer provides high gloss, imparts excellent reactivity and features outstanding chemical and mechanical fastness properties for the radiation-curable base layer.

Preferably, the base layer, at least in liquid state, comprises at least diacrylate, preferably at least one diacrylate chosen from the group consisting of: tricyclodecanedimethanol diacrylate; 1,6-hexanediol diacrylate; hexamethylene diacrylate; oxybis(methyl-2,1-ethanediyl) diacrylate; and 3-methyl 1,5-pentanediol diacrylate. These di-functional acrylic monomers are very reactive and are typically printed and/or sprayed, as embossing liquid (embossing ink), onto the original based layer (in liquid state) in order to create, position-selectively, indentations in the base layer. Droplets of this embossing ink can be applied onto the base layer in a very accurate manner, typically with a resolution of approximately 500-1,000 dpi (or more).

The grammage of the elevated pattern layer is at least 60 g/m$^2$, preferably at least 70 g/m$^2$. The grammage of the elevated pattern layer is preferably higher than the grammage of the base layer. The elevated pattern layer preferably comprises acrylic resin. More preferably, the elevated pattern layer, at least in liquid state, comprises biacrylate, preferably tripropylene glycol biacrylate. The elevated pattern layer can be printed and/or sprayed, position-selectively, onto the base layer. This printing process is preferably also executed in a very accurate manner, typically with a resolution of approximately 500-1,000 dpi (or more).

The upper surface of the embossing structure is preferably entirely covered by at least one finishing layer, such as a lacquer layer and/or wear layer. Typically, the one or more finishing layers situated below the at least one lacquer layer (acting as top finishing layer) are configured to act as wear layer. This wear layer may be at least partially composed of polyurethane, optionally enriched with aluminium oxide particles. As mentioned above, by entirely covering the embossing structure, the roughened texture of the embossing structure, may be protected and preserved by means of the at least one finishing layer. Sharp and/or heavy objects falling onto the surface covering could potentially damage the surface covering element, in particular the embossing structure. It is undesirable to damage the embossing structure since this might result in deep abrasions in the embossing structure, which do not reflect the decorative print layer properly. Moreover, these abrasions might have sharp corners, or be substantially deeper that the roughened texture that is provided on the embossing structure. To prevent this from happening, or at least suppress the consequences upon such an event, one or more finishing layers, in particular a laminate of finishing layers, preferably cover(s) the entire upper surface of the embossing structure. Preferably, at least one finishing layer, and more preferably each finishing layer, is free of any roughened texture. Preferably, at least one finishing layer, and more preferably each finishing layer, is a continuous (uninterrupted) layer. Preferably, at least one finishing layer, and more preferably each finishing layer, is a continuous (uninterrupted) layer. Preferably, at least one finishing layer, and more preferably each finishing layer, is a transparent layer allowing the decorative layer still to be seen through the finishing layer. The total thickness of the one or more finishing layer is preferably less than 1.0 mm, more preferably less than 0.6 mm. In case solely a lacquer is applied as finishing layer, the thickness of the finishing layer will typically be restricted to the order magnitude of several dozen microns. In an embodiment of a surface covering element according to the invention, at least at least a part of the indentations of the base layer is left uncovered by the lacquer layer. In this manner, a further embossing effect (relief effect) can be achieved, and, moreover, glossy and matt areas may be created in this manner, which may further contribute to a desired aesthetical appearance of the surface covering element as such. Here, for example, in case the décor image is formed by artificial tiles separated by grouts, the artificial tiles may be covered by the lacquer layer to provide these tiles a glossy effect, while the grouts are left substantially uncovered by the lacquer layer to maintain a more matt appearance.

It is imaginable that at least a part of at least one decorative layer is printed, preferably digitally printed, directly onto the upper side of the core. It is also imaginable that the upper side of the core is provided with at least one carrier layer, preferably formed by at least one primer or a film, wherein at least a part of the decorative layer is printed, preferably digitally printed, directly onto the carrier layer. The carrier layer can be affixed directly or indirectly (via one or more intermediate layers) onto the core. In case a primer is applied, then it is imaginable to apply at least two different primers, such as a glossy primer and a matt primer, which are position-selectively applied, side by side (adjacently), onto the core, preferably aligned in register with the decorative print layer to be applied on top of said primers. Also in this manner, a glossy effect and a matt effect can be realized at position-selective locations which can further contribute to a desired, realistic and/or artificial look (and feel) of the surface covering element as such.

In an embodiment of the surface covering element according to the invention, in between the printed decorative layer and the embossing structure at least one intermediate layer is situated. This intermediate layer is normally transparent, preferably very transparent, and/or translucent. Preferably, at least one intermediate layer is formed by a transparent or translucent, light-reflective thermoplastic layer, preferably a polyester layer, more preferably a polyethylene terephthalate layer (PET layer). This light-reflective thermoplastic layer acts as protective layer to protect the décor image against degradation due to exposure to daylight (or artificial light). Moreover, this light-reflective thermoplastic layer also prevents heating of the surface covering element due to exposure to daylight (or artificial light) and therefore counteracts thermal action (expansion and shrinkage), which is in favour of the durability and reliability of both the surface covering element as such and a floor covering consisting of a plurality of, preferably mutually coupled, surface covering elements. The light-reflective thermoplastic layer is preferably glued onto the printed decorative layer, more preferably by using a hot melt glue. The base layer may be applied directly on top of the light-reflective thermoplastic layer.

In some embodiments, the roughened texture may be provided to at least a part of the intermediate layer.

Typically, a backing layer is affixed to a lower side of the core. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness and impact resistances to each tile as such, which increases the durability of the tiles. Moreover, the (flexible) backing layer may increase the acoustic (sound-dampening) properties of the tiles.

In a preferred embodiment, a first panel edge (a first surface covering element edge) comprises a first coupling profile, and a second panel edge (a second surface covering element edge), preferably opposite to the first panel edge, comprising a second coupling profile being designed to engage interlockingly with said first coupling profile of an adjacent surface covering element, both in horizontal direction and in vertical direction, wherein the first coupling profile and the second coupling profile are preferably configured such that two of such surface covering elements can be coupled to each other by means of a lowering movement (fold-down movement). In case the surface covering element is rectangular, then the first panel edge and second panel edge are typically situated at opposite short edges of the surface covering element. The surface covering element preferably also comprises at least one third coupling profile and at least one fourth coupling profile located respectively at a third panel edge and a fourth panel edge, wherein the third coupling profile comprises: a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises: a third groove configured for accommodating at least a part of the sideward tongue of the third coupling profile of an adjacent surface covering element, said third groove being defined by an upper lip and a lower lip, wherein said lower lip is provided with an upward locking element, wherein the third coupling profile and the fourth coupling profile are configured such that two of such surface covering elements can be coupled to each other by means of a turning movement (angling down movement), wherein, in coupled condition: at least a part of the sideward tongue of a first surface covering element is inserted into the third groove of an adjacent, second surface covering element, and wherein at least a part of the upward locking element of said second surface covering element is inserted into the second downward groove of said first surface covering element.

The core may be flexible, semi-rigid or substantially rigid. The core may be solid or at least partially foamed. The core may comprise at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof. The core may comprise at least one wood-based material. The core may comprise at least one composite material of at least one polymeric material and at least one non-polymeric material. The at least one non-polymeric material is preferably selected from the group consisting of: talc, chalk, wood, calcium carbonate, and a mineral filler. The core may comprise magnesium oxide and/or magnesium hydroxide. The upper side of the core is preferably substantially flat.

The invention also relates to a surface covering element covering, such as a panel covering, in particular floor covering, ceiling covering, or wall covering, consisting of a plurality of, preferably mutually coupled, surface covering elements according to the invention. Here, it is imaginable that at least two surface covering elements have a distinctive décor image, wherein each décor image represents a partial image, and wherein the combination of said décor images together form a single image (picture or photo).

The invention further relates to a method of producing a decorative surface covering element according to the invention, comprising the steps of: A) forming at least one décor image onto the upper side of the core by means of printing, preferably digital printing, B) applying a liquid base layer on at least a part of at least one décor image formed during step A), C) position-selectively printing of a plurality of embossing droplets on the still liquid base layer in a manner, that the thickness of the base layer changes on the positions where the embossing droplets are spayed on, such that at these positions indentations are formed in the liquid base layer, D) at least partially curing said base layer provided with said indentations, E) position-selectively printing an elevated pattern layer formed by a plurality elevations on said base layer, preferably said base layer which is at least partially cured during step D), and F) at least partially curing said pattern layer, wherein said base layer and said pattern layer together form the embossing structure, and G) mechanically treating at least a part of the upper surface of the embossing structure to provide a roughened texture to the embossing structure, and K) applying a lacquer layer on the upper surface of the embossing structure. During step G) material is preferably removed from and/or deformed of the embossing structure. In order to keep the base layer sufficiently hard (rigid) to prevent easy flow and to keep the base layer sufficiently soft to allow easy roughening of the base layer, it is advantageous in case during step D) between 60 and 90% of the base layer is cured. The same applies to the pattern layer. During step G), preferably at least a part of the upper surface of the embossing structure is treated by using at least one axially rotating brush roller, preferably a metal brush roller, in particular a steel brush roller. The rotation speed of these rollers may vary, but is preferably between 400 and 800 revolutions per minute. The diameter of the roller may vary, but is preferably situated between 20 and 40 centimetre. Preferably, during step G) at least a part of the upper surface of the embossing structure is treated at least two times by using at least two successive axially rotating brush rollers, preferably metal brush rollers, in particular steel brush rollers. Preferably, during step G) at least two brush rollers are rotated in opposite directions. Preferably, each roller is accommodated in an individual or shared cage or housing to prevent uncontrolled distribution of cut-away material (dust), and more preferably this cage or housing is connected to a vacuum exhaust conduit to remove as much as cut-away material as possible during the brushing action.

It is advantageous in case the method comprises step H) comprising the step of mechanical cleaning the surface covering element, in particular the embossing structure, subsequent to executing step G). This cleaning action according to step H) can be performed mechanically, for example by means of a cleaning brush, in particular a cleaning brush roller, such as a textile roller and/or a nylon roller. This cleaning action is normally primarily applied in order to remove (evacuate) cut-away material (dust) from the embossing structure during step G).

In a preferred embodiment, Step H) is executed subsequent to step G) and prior to step K), since the lacquer layer could potentially enclose dirt and/or dust residuals left on the embossing structure, which is undesirable since the dirt and/or dust is visible through the lacquer layer.

Preferably, the method comprises step I) comprising the step of cutting the surface covering element into a plurality of smaller surface covering elements, like for example planks or panels. Preferably, the method comprises step J) comprising the profiling at least one edge of at least one surface covering element and/or at least one panel or plank formed during step I).

Further advantages and embodiments of the surface covering element have been discussed above already in an extensive manner. During step C) the embossing droplets are preferably printed onto the liquid base layer according to a first digital template, which is aligned in register with at least a part of at least one décor image formed during step A). During step E) the elevated pattern is preferably printed onto the base layer according to a second digital template, which is aligned in register with at least a part of at least one décor image formed during step A). More preferably, the first digital template differs from the second digital template. Preferably, curing of the base layer according to step D) and/or curing of the pattern layer according to step F) is performed of radiation curing, preferably by means of UV radiation and/or electron radiation and/or IR radiation and/or excimer radiation. By means of excimer radiation, the cured layer(s) can be provided a, preferably position-selective, matt appearance, which could be attractive from an aesthetical point of view.

Preferably, the method comprises step L) comprising the step of curing of the lacquer layer according to step K) by radiation curing, preferably by means of UV radiation and/or IR radiation and/or excimer radiation. Yet in a preferred embodiment steps L) and F) are performed simultaneously.

Further preferred embodiments of the present invention are elucidated in the following set of non-limitative clauses:

1. Decorative surface covering element, in particular a decorative panel, such as a floor panel, ceiling panel or wall panel, comprising:
   a core provided with an upper side and a lower side,
   a decorative top structure affixed, directly or indirectly, on said upper side of the core, said decorative top structure comprising:
   at least one decorative print layer forming at least one décor image,
   a substantially transparent or translucent three-dimensional embossing structure at least partially covering said print layer, wherein the embossing structure is a multi-layer embossing structure which comprises:
      at least one, at least partially cured base layer provided with a plurality of indentations, and
      at least one at least partially cured elevated pattern layer formed by a plurality of elevations printed on top of said base layer,
   wherein at least a part of an upper surface of the embossing structure is provided with a roughened texture.
2. Surface covering element according to clause 1, wherein an upper side of the base layer defines an embossing base level, and wherein the indentations and at least a part of the elevations are situated at opposite sides of said embossing base level.
3. Surface covering element according to clause 1 or 2, wherein an upper side of the base layer defines a base level, and wherein the indentations and at least a part of the elevations are situated at the same side of said base level.
4. Surface covering element according to one of the foregoing clauses, wherein a part of the base layer is provided with said plurality of indentations, and wherein another part of the base layer is free of indentations.
5. Surface covering element according to clause 4, wherein at least a part of the elevations are printed on the part of the base layer which is free of indentations.
6. Surface covering element according to one of the foregoing clauses, wherein the plurality of indentations of the base layer forms a discontinuous indentation pattern.
7. Surface covering element according to one of the foregoing clauses, wherein the base layer is a printed base layer.
8. Surface covering element according to one of the foregoing clauses, wherein the indentations provided in the base layer have a depth situated in between 2 micron and 100 micron, preferably situated in between 3 micron and 50 micron.
9. Surface covering element according to one of the foregoing clauses, wherein the elevations of the elevated pattern layer have a height situated in between 2 micron and 500 micron, preferably situated in between 3 micron and 300 micron.
10. Surface covering element according to one of the foregoing clauses, wherein at least a part of the indentations of the base layer is aligned in register with at least a part of at least one decor image formed by the decorative print layer.
11. Surface covering element according to one of the foregoing clauses, wherein at least a part of the elevations of the elevated pattern layer is aligned in register with at least a part of at least one decor image formed by the decorative print layer.
12. Surface covering element according to one of the foregoing clauses, wherein the at least one additional decorative print layer is situated in at least one base layer and at least one elevated pattern layer.
13. Surface covering element according to one of the foregoing clauses, wherein a coloured coating is provided in the indentations and onto the base layer.
14. Surface covering element according to one of the foregoing clauses, wherein at least a part of the indentations are chemically embossed indentations.
15. Surface covering element according to one of the foregoing clauses, wherein the grammage of the base layer is at least 40 g/m$^2$, preferably at least 50 g/m$^2$.
16. Surface covering element according to one of the foregoing clauses, wherein the base layer comprises acrylic resin.
17. Surface covering element according to clause 16, wherein the base layer comprises propylidynetrimethanol, ethoxylated, esters with acrylic acid.
18. Surface covering element according to clause 16 or 17, wherein the base layer comprises at least one epoxy acrylate oligomer.
19 Surface covering element according to one of clauses 16-18, wherein the base layer comprises at least diacrylate, preferably at least one diacrylate chosen from the group consisting of: tricyclodecanedimethanol diacrylate; 1,6-hexanediol diacrylate; and 3-methyl 1,5-pentanediol diacrylate.
20. Surface covering element according to one of the foregoing clauses, wherein the grammage of the elevated pattern layer is at least 60 g/m$^2$, preferably at least 70 g/m$^2$.

21. Surface covering element according to one of the foregoing clauses, wherein the elevated pattern layer comprises acrylic resin.

22. Surface covering element according to clause 21, wherein the elevated pattern layer comprises biacrylate, preferably tripropylene glycol biacrylate.

23. Surface covering element according to one of the foregoing clauses, wherein the embossing structure is at least partially covered by a lacquer layer.

24. Surface covering element according to clause 23, wherein at least at least a part of the indentations of the base layer is left uncovered by the lacquer layer.

25. Surface covering element according to one of the foregoing clauses, wherein at least a part of the decorative layer is printed directly onto the upper side of the core.

26. Surface covering element according to one of the foregoing clauses, wherein the upper side of the core is provided with a carrier layer, preferably formed by a primer or a film, wherein at least a part of the decorative layer is printed directly onto the carrier layer.

27. Surface covering element according to one of the foregoing clauses, wherein in between the printed decorative layer and the embossing structure at least one intermediate layer is situated.

28. Surface covering element according to clause 27, wherein at least one intermediate layer is formed by a transparent or translucent, light-reflective thermoplastic layer, preferably a polyester layer, more preferably a polyethylene terephthalate layer.

29. Surface covering element according to clause 28, wherein said light-reflective thermoplastic layer is glued onto the printed decorative layer.

30. Surface covering element according to clause 28 or 29, wherein the base layer is applied directly on top of the light-reflective thermoplastic layer.

31. Surface covering element according to one of the foregoing clauses, wherein a backing layer is affixed to a lower side of the core.

32. Surface covering element according to one of the foregoing clauses, wherein a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are preferably configured such that two of such surface covering elements can be coupled to each other by means of a lowering movement.

33. Surface covering element according to one of the foregoing clauses, wherein the surface covering element comprises at least one third coupling profile and at least one fourth coupling profile located respectively at a third panel edge and a fourth panel edge, wherein the third coupling profile comprises:
    a sideward tongue extending in a direction substantially parallel to the upper side of the core,
    at least one second downward flank lying at a distance from the sideward tongue, and
    a second downward groove formed between the sideward tongue and the second downward flank,
wherein the fourth coupling profile comprises:
    a third groove configured for accommodating at least a part of the sideward tongue of the third coupling profile of an adjacent surface covering element, said third groove being defined by an upper lip and a lower lip, wherein said lower lip is provided with an upward locking element,
wherein the third coupling profile and the fourth coupling profile are configured such that two of such surface covering elements can be coupled to each other by means of a turning movement, wherein, in coupled condition: at least a part of the sideward tongue of a first surface covering element is inserted into the third groove of an adjacent, second surface covering element, and wherein at least a part of the upward locking element of said second surface covering element is inserted into the second downward groove of said first surface covering element.

34. Surface covering element according to one of the foregoing clauses, wherein the core is substantially rigid.

35. Surface covering element according to one of the foregoing clauses, wherein the core is at least partially foamed.

36. Surface covering element according to one of the foregoing clauses, wherein the core comprises at least one polymer selected from the group consisting of: ethylene vinyl acetate (EVA), polyurethane (PU), polyethylene (PE), polypropylene (PP), polystyrene (PS), polyvinylchloride (PVC), polyethylene terephthalate (PET), Polyisocyanurate (PIR), or mixtures thereof.

37. Surface covering element according to one of the foregoing clauses, wherein the core comprises at least one wood-based material.

38. Surface covering element according to one of the foregoing clauses, wherein the core comprises at least one composite material of at least one polymeric material and at least one non-polymeric material.

39. Surface covering element according to clause 38, wherein at least one non-polymeric material is selected from the group consisting of: talc, chalk, wood, calcium carbonate, and a mineral filler.

40. Surface covering element according to one of the foregoing clauses, wherein the core comprises magnesium oxide and/or magnesium hydroxide.

41. Surface covering element according to one of the foregoing clauses, wherein the embossing substrate comprises a plurality of base layers and/or a plurality of elevated pattern layers.

42. Surface covering element according to one of the foregoing clauses, wherein the upper side of the core is substantially flat.

43. Surface covering element according to one of the foregoing clauses, wherein the roughened texture is provided by brushing the upper surface of the embossing structure.

44. Surface covering element according to one of the foregoing clauses, wherein the roughened texture of the upper surface of the embossing structure comprises a plurality of adjacent substantially flat surface facets mutually enclosing angle.

45. Surface covering element according to one of the foregoing clauses, wherein the embossing structure comprises at least one thixotropic agent.

46. Surface covering element according to one of the foregoing clauses, wherein the base layer and/or the pattern layer is composed of a water based ink composition.

47. Surface covering element according to one of the foregoing clauses, wherein the base layer and/or the pattern layer is composed of an ink composition comprising: a) at least one organic and/or water-based ink vehicle, (b) at least one ethanolamine compound, and (c) at least one colour-imparting material, such as a pigment.

48. Surface covering element according to one of the foregoing clauses, wherein the entire upper surface of the embossing structure is provided with a roughened texture.

49. Surface covering element according to one of the foregoing clauses, wherein the roughened texture is provided both to at least a part of the base layer and to at least a part of the pattern layer.

In some embodiments, the roughened texture may be provided to at least a part of the intermediate layer.

51. Surface covering element according to one of the foregoing clauses, wherein the roughened texture comprises a plurality of scratches and/or sharp edges.

52. Surface covering element according to one of the foregoing clauses, wherein the embossing structure is a printed embossing structure, and wherein at least a part of an upper surface of the printed embossing structure is provided with a mechanically roughened texture.

53. Surface covering element according to one of the foregoing clauses, wherein the embossing structure provided with the roughened texture has the appearance of natural wood nerves.

54. Surface covering element according to one of the foregoing clauses, wherein the surface covering element is a strip provided as a roll to be laid out by unrolling from said roll 55. Surface covering element covering, in particular floor covering, ceiling covering, or wall covering, consisting of mutually coupled surface covering elements according to any of the of the foregoing clauses.

56. Method of producing a decorative surface covering element according to one of clauses 1-54, comprising the steps of:

A) forming at least one décor image onto the upper side of the core by means of printing, preferably digital printing, B) applying a liquid base layer on at least a part of at least one décor image formed during step A), C) position-selectively printing of a plurality of embossing droplets on the still liquid base layer in a manner, that the thickness of the base layer changes on the positions where the embossing droplets are spayed on, such that at these positions indentations are formed in the liquid base layer, D) at least partially curing said base layer provided with said indentations, E) position-selectively printing an elevated pattern layer formed by a plurality elevations on said base layer, preferably said base layer which is at least partially cured during step D), and F) partially curing said pattern layer, wherein said base layer and said pattern layer together form the embossing structure, G) mechanically treating at least a part of the upper surface of the embossing structure to provide a roughened texture to the embossing structure.

57. Method according to clause 56, wherein the during step G) material is removed from the embossing structure.

58. Method according to clause 56 or 57, wherein during step D) between 60 and 90% of the base layer is cured.

59. Method according to one of clauses 56-58, wherein during step F) between 60 and 90% of the pattern layer is cured.

60. Method according to one of clauses 56-59, wherein during step G) at least a part of the upper surface of the embossing structure is treated by using at least one axially rotating brush roller, preferably a metal brush roller, in particular a steel brush roller.

61. Method according to clause 60, wherein during step G) at least a part of the upper surface of the embossing structure is treated at least two times by using at least two successive axially rotating brush rollers, preferably metal brush rollers, in particular steel brush rollers.

62. Method according to clause 61, wherein during step G) at least two brush rollers are rotated in opposite directions.

63. Method according to one of clauses 56-62, wherein the method comprises step H) comprising the step of mechanical cleaning the surface covering element, in particular the embossing structure, subsequent to executing step G).

64. Method according to one of clauses 56-63, wherein the method comprises step I) comprising the step of cutting the surface covering element into a plurality of smaller surface covering elements.

65. Method according to one of clauses 56-64, wherein the method comprises step J) comprising the profiling at least one edge of at least one surface covering element.

66. Method according to one of clauses 56-65, wherein during step C) the embossing droplets are printed onto the liquid base layer according to a first digital template, which is aligned in register with at least a part of at least one décor image formed during step A).

67. Method according to one of clauses 56-66, wherein during step E) the elevated pattern is printed onto the base layer according to a second digital template, which is aligned in register with at least a part of at least one décor image formed during step A).

68. Method according to one of clauses 56-67, wherein the first digital template differs from the second digital template.

69. Method according to one of clauses 56-68, wherein curing of the base layer according to step D) and/or curing of the pattern layer according to step F) is performed of radiation curing, preferably by means of UV radiation and/or electron radiation and/or IR radiation.

BRIEF DESCRIPTION OF THE DRAWINGS

The invention will be elucidated on the basis of non-limitative exemplary embodiments shown in the following figures.

FIGS. 1*a*-1*g* show subsequent steps of a method according to an embodiment of the present invention;

DETAILED DESCRIPTION OF THE INVENTION

The invention will be elucidated on the basis of non-limitative exemplary embodiments shown in the following figures.

Figure 1F:
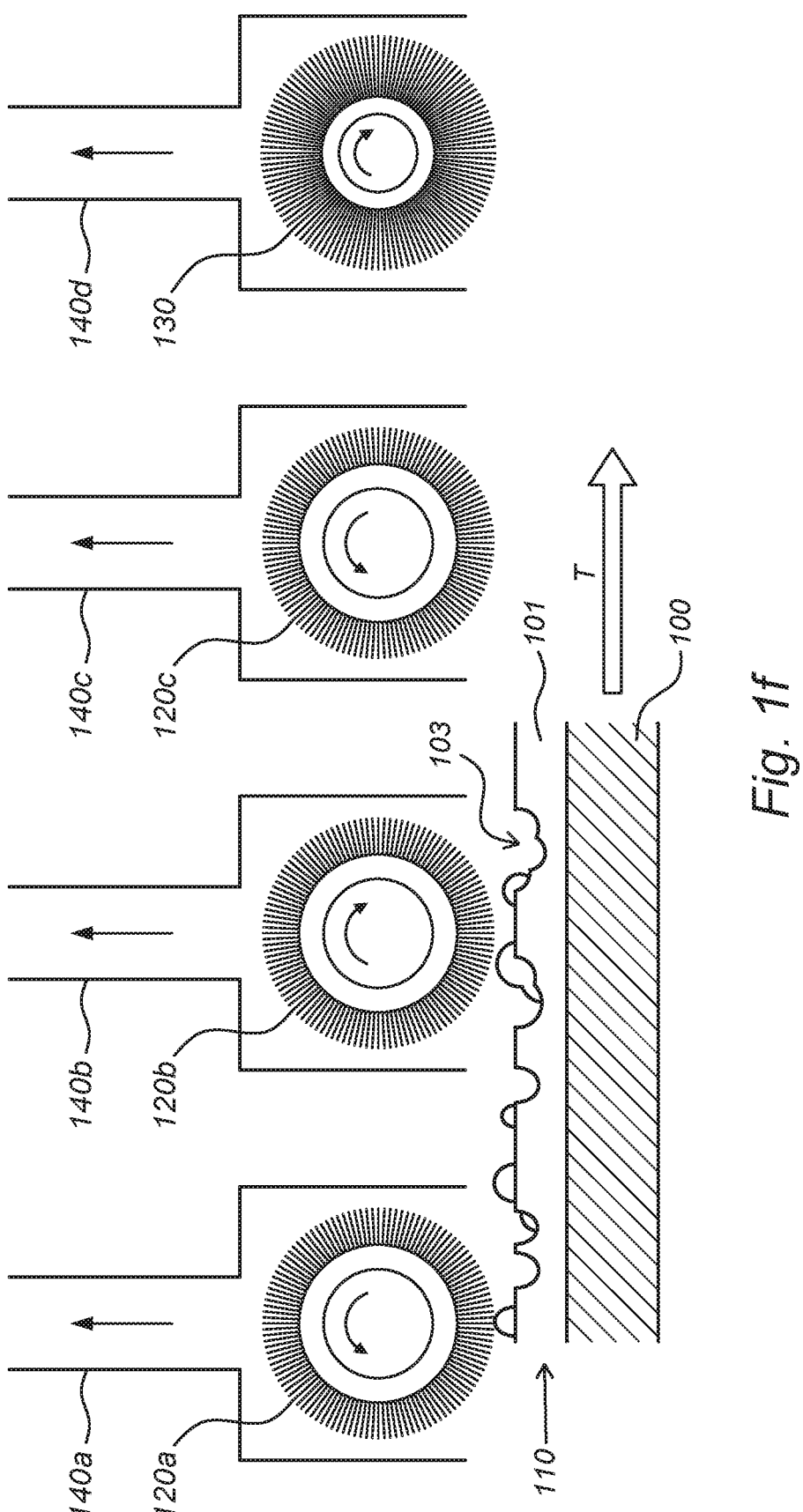
Figure 1G:
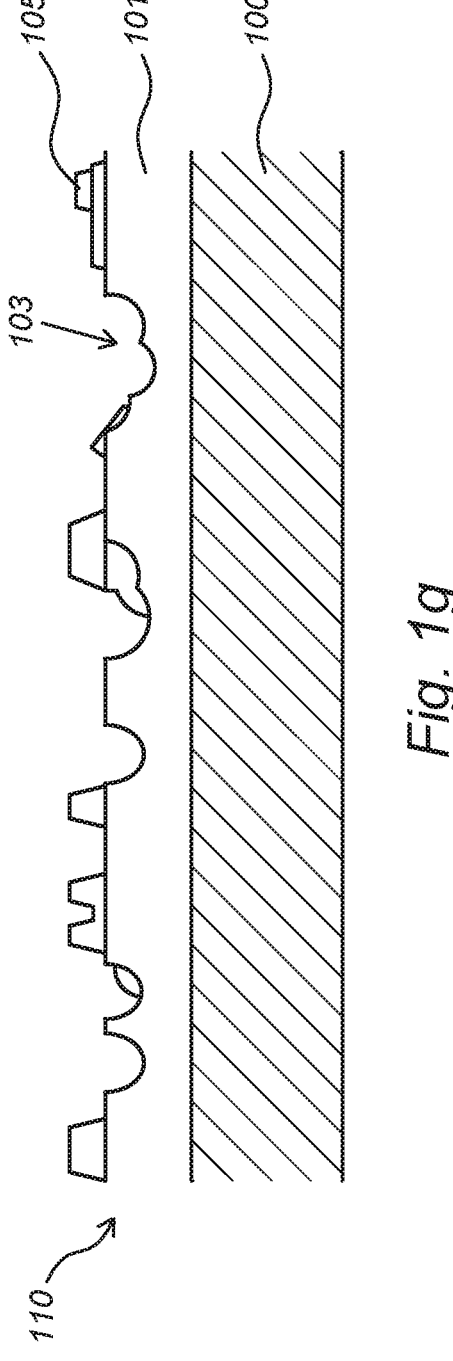

FIGS. 1a-1g show subsequent steps of a method according to the present invention. FIG. 1a shows a schematic representation of a cross section of a decorative panel (110) as an example of a surface covering element according to the invention. The figure shows the core (100) of the panel (110). The core (100) is typically substantially rigid, and may possibly comprises at least one polymer and/or at least one wood-based material. A décor image is formed onto the upper side (100A) of the core (100) by means of printing, in particular digital printing. FIG. 1b show that a liquid base layer (101) is applied on the décor image formed at the upper side (100A) of the panel (110). The liquid forming the liquid base layer (101) is for example a UV sealer. The liquid base layer (101) generally has a relatively high surface tension in order to allow precise embossing in the liquid base layer (101). FIG. 1c show that a plurality of embossing droplets (102) is position-selectively printed on the still liquid base layer (101). This is done such that the thickness of the base layer (101) changes on the positions where the embossing droplets (102) are spayed on. FIG. 1d shows that this results in that positions indentations (103) are formed in the liquid base layer (101) at the positions where the embossing droplets (102) are sprayed on. The base layer (101) is at least partially cured after the base layer (101) is provided with said indentations (103). Subsequently an elevated pattern layer is formed by position-selectively printing of a plurality elevations on the base layer (101). The elevation droplets (104) applied onto the panel (110) are shown in FIG. 1d. The pattern layer obtained via the position-selectively printing of the elevations (105) is subsequently at least partially cured. Preferably, the embossing droplets (102) and/or the elevation droplets (104) have a surface tension which is higher than the surface tension of the liquid base layer (101). Optionally, one or more finishing layers (not shown) can be applied to the panel (110). Via the steps shown in FIGS. 1a-1e, a decorative panel (110) is obtained, comprising a core (100) and a decorative top structure affixed on the upper side (100A) of the core (100). The decorative top structure comprises a decorative print layer forming at least one décor image and a substantially transparent or translucent three-dimensional embossing structure at least partially covering said print layer. The embossing structure is a multi-layer embossing structure which comprises a base layer (101) provided with a plurality of indentations (103) and an elevated pattern layer formed by a plurality of elevations (105) printed on top of said base layer (101). It can be seen that the indentations (103) and the elevations (105) can overlap, such that a panel (110) having an irregular height structure is obtained. The plurality of indentations (103) of the base layer (101) forms a discontinuous indentation pattern. The panel (110) may possibly comprise multiple coupling profiles for coupling multiple panels (110). The panel (110) may also comprise a backing layer (not shown) affixed to a lower side of the core (100). In FIG. 1f it is shown that the embossing structure is mechanically treated by means of a plurality of successively oriented rotating cylindrical brush rollers (120a, 120b, 120c), wherein adjacent brush rollers (120a, 120b, 120c) axially rotate in opposite directions. The brush rollers (120a, 120b, 120c) typically have relatively sturdy and/or rigid brush wires, preferably at least partially made of metal, more preferably of steel and/or a composite of steel and carbon. The diameter of the brush rollers (120a, 120b, 120c) in this exemplary embodiment is substantially 30 centimetre. The rotation speed of the brush rollers (120a, 120b, 120c) is typically between 550 and 650 revolutions per minute (rpm), and is preferably substantially equal to 600 rpm. The brush rollers (120a, 120b, 120c) are used to transform the (complete) initially smooth texture of the upper surface of the panel (110) into a more roughened texture of the upper surface of the panel (110). This roughened texture of the embossing structure has typically more sharp edges, and has a look and feel appearance which comes close(r) to natural wood nerves, as shown in more detail in FIG. 1g. This is in particular advantageous in case the décor image also constitutes a wood nerve pattern, preferably a wood nerve pattern, wherein the decorated wood nerves are in register (in line) with the embossed wood nerves. During this mechanical action, material will be removed from the embossing structure, and optionally also from an intermediate transparent layer (if applied) situation in between the embossing structure and the décor image, which material will be released as dust particles. To evacuate at least a part of the dust particles created during this mechanical brushing action (roughening action), each brush roller (120a, 120b, 120c, 130) is enclosed by a cover (140a, 140b, 140c, 140d), also referred to as housing or cage, which cover (140a, 140b, 140c, 140d) is connected to a vacuum system (not shown). During further displacement of the panel (110) in a transport direction T, the panel (110) will pass an axially rotating cylindrical cleaning brush roller (130) having more soft wires, such as textile and/or nylon wires, to remove further dust particles from the panel (110). Typically after roughening and cleaning, the panel (110) will be cut into smaller panels, and will be profiled at two or four panel edges (not shown).

Figure 2A:
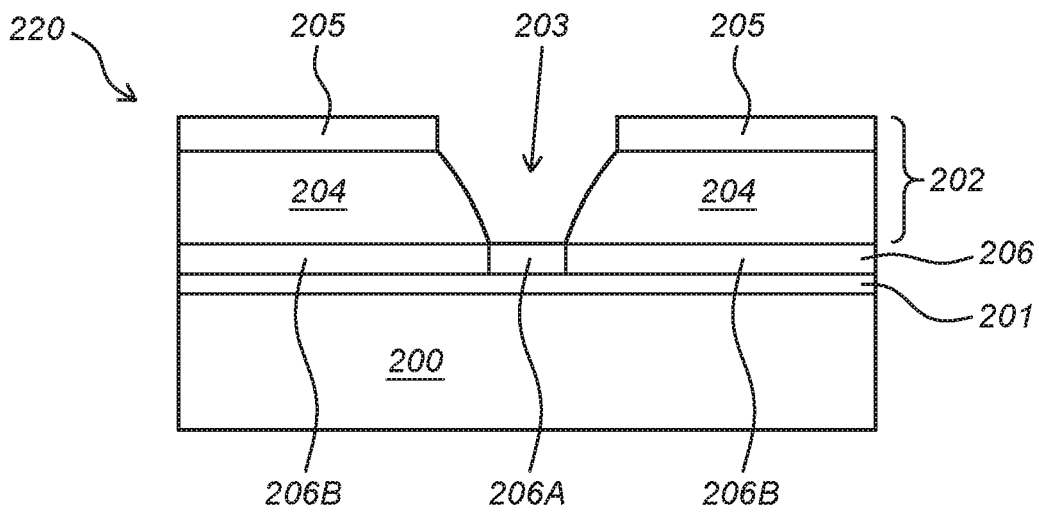
FIG. 2*a* shows a schematic representation of another example of a decorative panel (220) according to an embodiment of the present invention.

FIG. 2a shows a schematic representation of another example of a decorative panel (220) according to the present invention. The panel (220) comprises a core (200) provided with an upper side and a lower side, and a decorative top structure (201) affixed, directly or indirectly, on said upper side of the core (200). The decorative top structure (201) comprises a decorative print layer forming at least one décor image. The panel (220) also comprises a substantially transparent or translucent three-dimensional embossing structure (202) covering said print layer (201). In the shown embodiment comprises the embossing structure (202) a base layer (204) provided with a plurality of indentations (203), and an elevated pattern layer formed by a plurality of elevations (205) printed on top of said base layer (204). The elevations form part of a lacquer layer (205). A carrier layer (206), and in particular a primer layer (206) is present enclosed between the top structure (201) and the embossing structure (202). In the shown embodiment, the primer layer (206) comprises a pattern of mat primer (206A) and glossy primer (206B). The indentations (203) are present where the primer layer (206) is provided with mat primer (206A). The structured elevations (205) cover the glossy primer (206B) of the primer layer (206). Due to the embossing structure (202) being substantially transparent, the differences within the primer layer (206) are visible. It is also conceivable that the primer layer (206) is attached onto the upper side of the core (200), and that the decorative top structure (201) is attached onto the primer layer (206).

Figure 2B:
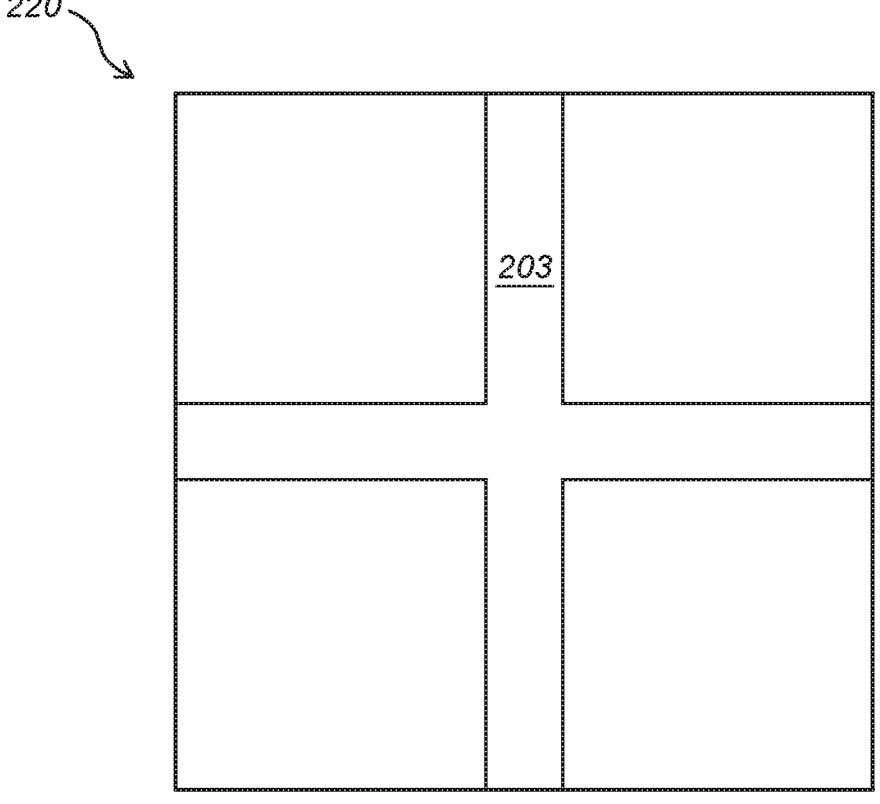
FIG. 2*b* shows a top view of the panel (220) shown in FIG. 2*a*.

FIG. 2*b* shows a top view of the panel (220) shown in FIG. 2*a*. It can be seen that due to a part of the base layer being provided with said plurality of indentations (203) and part of the base layer being free of indentations a visually observable pattern is obtained. This effect is further reinforced by the primer layer (206) comprising both mat and glossy primer (206A, 206B) in a pattern which is in line with the embossing structure (202).

Figure 3:
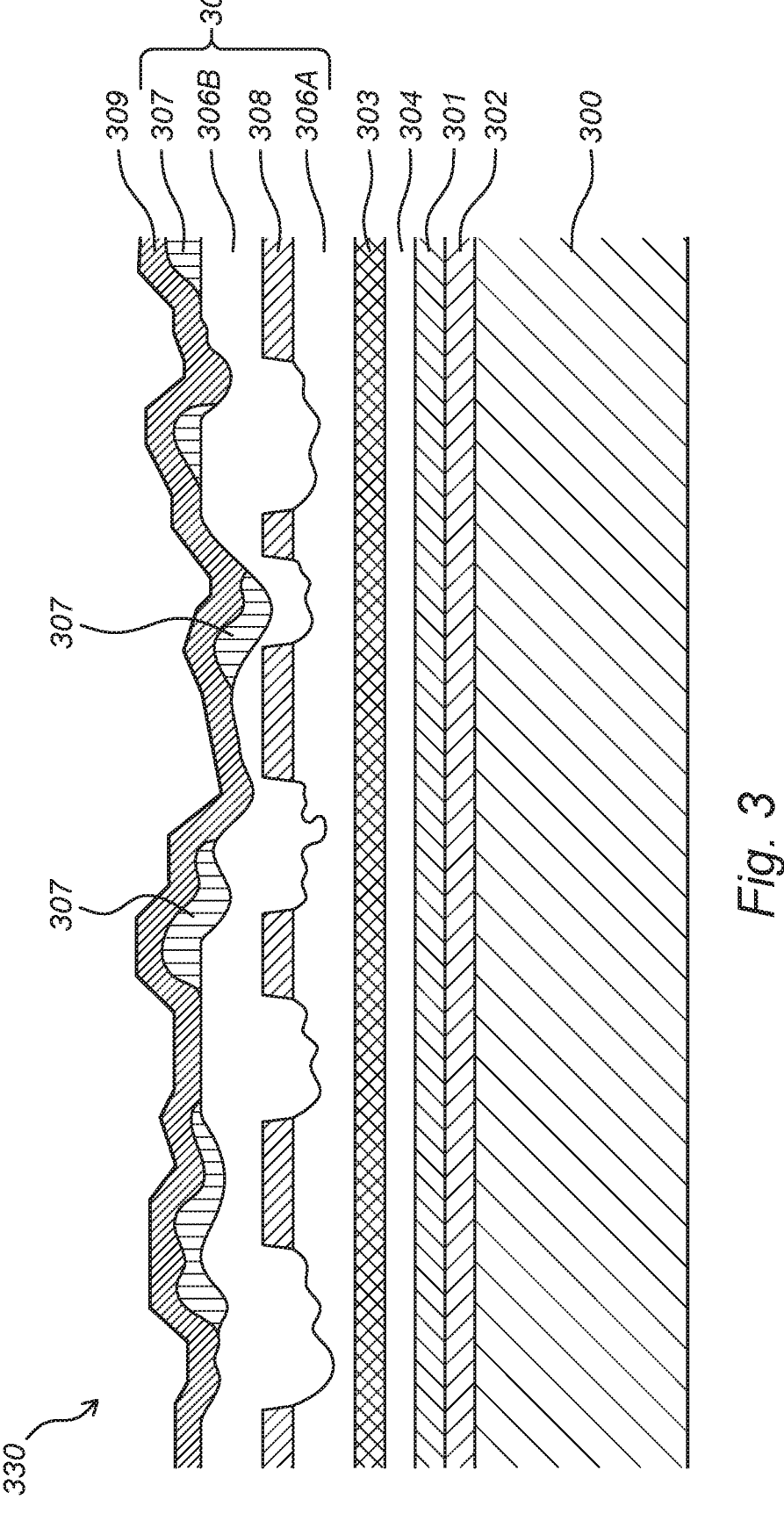
FIG. 3 shows a schematic representation of a further example of a decorative panel (330) according to an embodiment of the present invention.

FIG. 3 shows a schematic representation of a further example of a decorative panel (330) according to the present invention. The figure show a cross section of a decorative panel (330), in particular a floor panel (330). The panel (330) comprises a core (300) provided with an upper side and a lower side. A decorative print layer (301) is indirectly affixed on the upper side of the core (300). A carrier layer (302) formed by a primer (302) is present in between the core (300) and the decorative layer (301) in order to provide better adhesion of the decorative layer (301). An interme-diate layer (303) is present on top of the printed decorative top layer (301). The intermediate layer (303) is formed by a transparent or translucent, light-reflective thermoplastic layer (303). The light-reflective thermoplastic layer (303) is glued onto the printed decorative layer (301) by means of a hot melt glue layer (304). A substantially transparent or translucent three-dimensional embossing structure (305) is positioned on top op of aforementioned layers (300, 301, 302, 303, 304). The embossing structure (305) is a multi-layer embossing structure (305) which comprises two at least partially cured base layers (306A, 306B) provided with a plurality of indentations. A part of each base layer (306A, 306B) is free of indentations. The embossing structure (305) also comprises an elevated pattern layer (307) formed by a plurality of elevations printed on top of the upper base layer (306B). The elevations are both printed on parts of the base layer (306B) that respectively provided with indentations and parts that are free of indentations. Despite not shown, it is also conceivable that an embossing layer is present on top of the lower base layer (306A). A secondary printed deco-rated layer (308) is affixed to the lower base layer (306A). This printed decorative layer (308) is affixed to the parts of the base layer (306A) which is free of indentations. The entire panel (330) is covered with a finishing layer (309), in particular a lacquer layer (309). The panel (330) benefits of the presence of two printed decorative layers (301, 308), resulting in that a unique visual pattern can be obtained. The indentations provided in the base layer (306A, 306B) typi-cally have a depth situated in between 2 micron and 100 micron, preferably situated in between 3 micron and 50 micron. The elevations of the elevated pattern layer (307) typically have a height situated in between 2 micron and 500 micron, preferably situated in between 3 micron and 300 micron. The embossing structure, in particular one or both base layers (306A, 306B) and/or the pattern layer (307) and/or the finishing layer (309) is provided with a roughened texture by mechanically brushing these one or more layers (directly) after application. Here, it is conceivable that a layer is mechanically roughened (and optionally cleaned) prior to applying one or more further layers on top of said roughened layer.

Figure 4A:
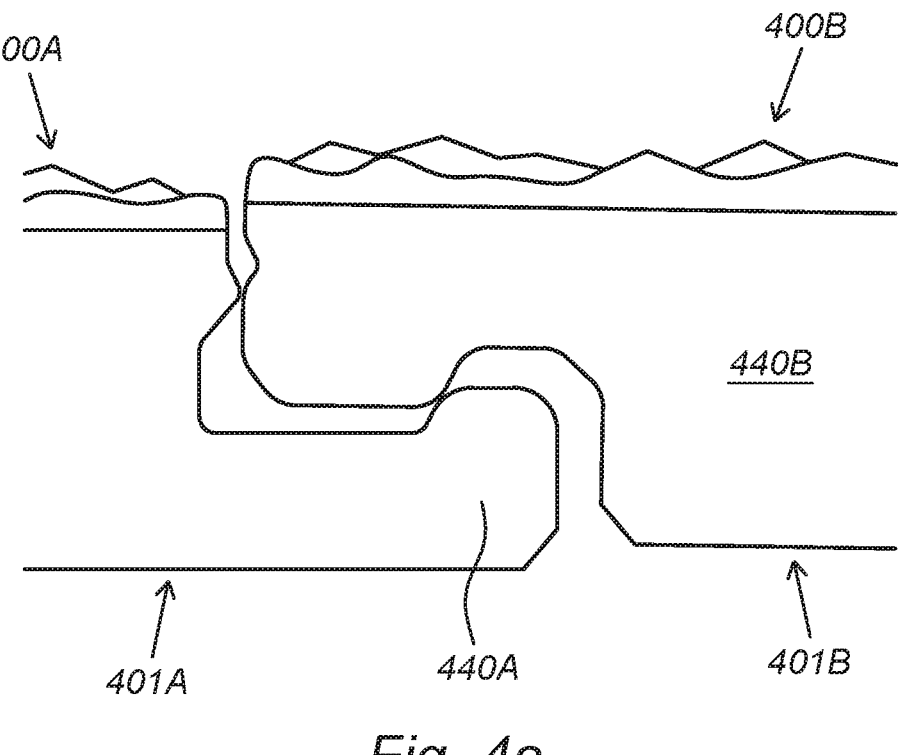
FIGS. 4a and 4b show non-limiting examples of coupling profiles (401A, 401B, 402A, 402B) used in panels (400A, 400B) according to an embodiment of the present invention.
Figure 4B:
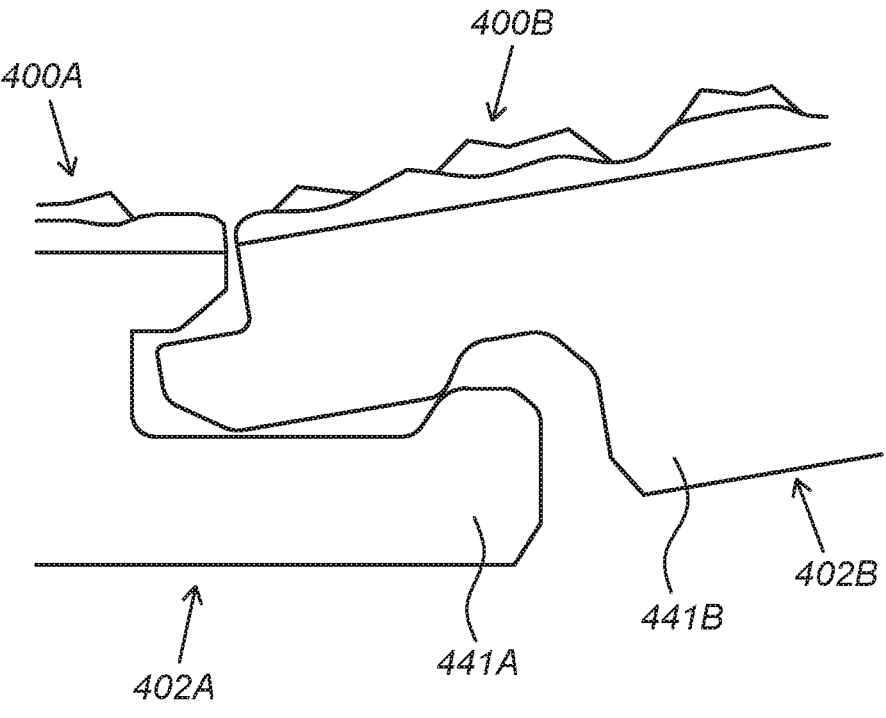

FIGS. 4*a* and 4*b* show non-limiting examples of coupling profiles (401A, 401B, 402A, 402B) used in panels (400A, 400B) according to the present invention, having an emboss-ing structure with a mechanically roughened upper surface, e.g. as discussed and shown in the previous figures. A first panel edge (440A) comprises a first coupling profile (401A), and a second panel edge (440B) opposite to the first panel edge (440A), comprising a second coupling profile (401B)

being designed to engage interlockingly with said first coupling profile (401A) of an adjacent panel, both in hori-zontal direction and in vertical direction, wherein the first coupling profile (401A) and the second coupling profile (401B) are configured such that two of such panels can be coupled to each other by means of a lowering movement. This is shown in FIG. 4*a*. FIG. 4*b* show the panel comprising a third coupling profile (402A) and a coupling profile (402B) located respectively at a third panel edge (441A) and a fourth panel edge (441B). The third coupling profile (402A) and the fourth coupling profile (402B) are configured such that two of such panels (440A, 440B) can be coupled to each other by means of a turning movement, wherein, in coupled condition: at least a part of the sideward tongue of a first panel is inserted into the third groove of an adjacent, second panel, and wherein at least a part of an upward locking element of said second panel is inserted into the second downward groove of said first panel.

Hence, the above-described inventive concepts are illus-trated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "com-prise", but are also understood to mean the phrases "con-tain", "substantially consist of", "formed by" and conjuga-tions thereof.

The invention claimed is:

1. A decorative surface covering element, in particular a decorative panel, such as a floor panel, ceiling panel or wall panel, comprising:
   a core provided with an upper side and a lower side,
   a decorative top structure affixed, directly or indirectly, on said upper side of the core, said decorative top structure comprising:
   at least one decorative print layer forming at least one decor image,
   a substantially transparent or translucent three-dimen-sional embossing structure at least partially covering said print layer, wherein the embossing structure is a multi-layer embossing structure which comprises:
   at least one, at least partially cured base layer provided with a plurality of indentations, and
   at least one at least partially cured elevated pattern layer formed by a plurality of elevations digitally printed on top of said base layer,
   wherein at least a part of an upper surface of the embossing structure is provided with a roughened texture, and
   at least one finishing layer at least partially covering the roughened embossing structure.

2. The surface covering element according to claim 1, wherein the upper side of the base layer defines an emboss-ing base level, and wherein the indentations and at least a part of the elevations are situated at opposite sides of said embossing base level.

3. The surface covering element according to claim 1, wherein the upper side of the base layer defines a base level, and wherein the indentations and at least a part of the elevations are situated at the upper side of said base level.

4. The surface covering element according to claim 1, wherein a part of the base layer is provided with said plurality of indentations, and wherein another part of the base layer is free of indentations.

5. The surface covering element according to claim 4, wherein at least a part of the elevations are printed on the part of the base layer which is free of indentations.

6. The surface covering element according to claim 1, wherein the plurality of indentations of the base layer forms a discontinuous indentation pattern.

7. The surface covering element according to claim 1, wherein the base layer is a printed base layer.

8. The surface covering element according to claim 1, Wherein at least a part of the indentations of the base layer is aligned in register with at least a part of at least one decor image formed by the decorative print layer.

9. The surface covering element according to claim 1, wherein a colored coating is provided in the indentations and onto the base layer.

10. The surface covering element according to claim 1, wherein the base layer comprises acrylic resin.

11. The surface covering element according to claim 1, wherein the elevated pattern layer comprises acrylic resin.

12. The surface covering element according to claim 1, wherein the at least one finishing layer is applied and wherein the upper surface of the embossing structure is entirely covered by one of the at least one finishing layer, wherein, the at least one finishing layer comprises a lacquer layer.

13. The surface covering element according to claim 1, wherein the at least one finishing layer is applied and wherein one of the at least one finishing layer is free of any roughened texture.

14. The surface covering element according to claim 1, wherein at least a part of the decorative layer is printed directly onto the upper side of the core.

15. The surface covering element according to claim 1, wherein the upper side of the core is provided with a carrier layer, wherein the carrier layer comprises a primer or a film, wherein at least a part of the decorative layer is printed directly onto the carrier layer.

16. The surface covering element according to claim 1, wherein in between the printed decorative layer and the embossing structure at least one intermediate layer is situated, wherein at least one intermediate layer is formed by a transparent or translucent light reflective thermoplastic layer, wherein the transparent or translucent light reflective thermoplastic layer comprises a polyester layer or a polyethylene terephthalate layer, wherein said transparent or translucent light reflective thermoplastic layer is glued onto the printed decorative layer.

17. The surface covering element according to claim 1, wherein a first panel edge comprises a first coupling profile, and a second panel edge, preferably opposite to the first panel edge, comprising a second coupling profile being designed to engage interlockingly with said first coupling profile of an adjacent panel, both in horizontal direction and in vertical direction, wherein the first coupling profile and the second coupling profile are configured such that two of such surface covering elements can be coupled to each other by means of a lowering movement.

18. The surface covering element according to claim 1, wherein the core is at least partially foamed.

19. The surface covering element according to claim 1, wherein the core comprises at least one composite material of at least one polymeric material and at least one non-polymeric material.

20. The surface covering element according to claim 1, wherein the embossing structure comprises a plurality of base layers and/or a plurality of elevated pattern layers.

21. The surface covering element according to claim 1, wherein the roughened texture is brushed roughened texture.

22. The surface covering element according claim 1, wherein the base layer and/or the pattern layer comprises a water based ink composition.

23. The surface covering element according to claim 1, wherein the roughened texture is provided to at least a part of the base layer and to at least a part of the pattern layer.

24. The surface covering element according to claim 1, wherein the embossing structure is a printed embossing structure, and wherein at least a part of an upper surface of the printed embossing structure is provided with the roughened texture.

\* \* \* \* \*